United States Patent Office 3,637,580
Patented Jan. 25, 1972

3,637,580
METHOD FOR PREVENTING SAGGING OF COATING MATERIALS
Kenichi Hattori and Atushi Goukon, Wakayama-shi, Yoshiaki Komeda, Tokyo, and Hiroshi Mori, Wakayama-shi, Japan, assignors to Kao Soap Co., Ltd., Tokyo, Japan
No Drawing. Filed Aug. 25, 1969, Ser. No. 852,933
Int. Cl. C08g 51/04
U.S. Cl. 260—40 R                    4 Claims

ABSTRACT OF THE DISCLOSURE

A paint composition containing from 0.05 to 10% by weight, based on the total weight of the paint composition, of an antisagging agent made by reacting one mole of a dimer acid with 0.1 to 0.99 mole of a glycol of the formula HO—$(CH_2CH_2O)_n$—H, wherein $n$ is a number from 1 to 30, until the hydroxyl value of the reaction mixture reaches a constant value of less than 10.

This invention relates to a method for preventing sagging of coating materials by using a novel oily anti-sagging agent derived from dimer acid.

Conventional air-drying ready mixed paints, fatty acid-modified resin paints, oil-modified synthetic resin paints and other oil paints have a common disadvantage of sagging as they are applied on surfaces by a wide variety of coating techniques such as brush coating, dip coating, flow coating, and spray coating. The sagging leads to irregularity of the coated films and necessitates double coating and other extra work, thus rendering it difficult to achieve a sufficient coating effect.

To eliminate this disadvantage, a number of anti-sagging agents have been developed for coating materials. Among those agents known in the art are: polymerized oils, polyamide resins, metallic soaps such as aluminum stearate and zinc stearate, fully hydrogenated castor oil, polyethylene wax, and polymers of polyester amides and phthalic alkyds.

However, these substances usually are solid or pasty at room temperature and generally show such poor compatibility with coating materials that they cause blisters when mixed with the latter. In order to avotid this, an additional process of preliminary kneading would be needed prior to treatment by an attrition device or sand grinder, thus lowering the workability of the coating operation.

In an effort to overcome these difficulties of the prior art techniques, we have discovered novel oily antistagging agents which are readily soluble in coating materials such as mentioned above and which would require no preliminary kneading with the coating material, and this discovery of these antisagging agents have lead to the establishment of an excellent method for preventing sagging of coating materials.

The antisagging agents which are used in the method according to the present invention are the reaction products obtained by reacting one mole of a dimer acid with 0.1 to 0.99 mole, preferably 0.2 to 0.95 mole, of a glycol of the general formula HO—$(CH_2CH_2O)_n$—H (wherein $n$ is a number from 1 to 30, preferably from 1 to 15) until the hydroxyl value of the reaction mixture reaches a constant value of not higher than 10. These reaction products are always composed substantially of compounds having molecules terminated with carboxyl groups at both ends and which contain some unreacted hydroxyl groups. These compounds are oily at room temperature and mix easily with oily paints such as phthalic alkyd and urethane oils (oil-modified types) or ready mixed paints, thus displaying a great antisagging effect without substantially any sacrifice of gloss of the coated surface.

Dimer acids which are used for producing the antisagging agents according to the present invention are $C_{36}$, long chain, aliphatic dibasic acids and are obtained by polymerizing a natural or synthetic, polymerizable unsaturated monobasic fatty acid having a hydrocarbon chain containing from 8 to 24 carbon atoms (usually 18 carbon atoms) in the molecule through a thermal polymerization or a catalytic polymerization process by using, for example, activated clay as a catalyst.

Usually, dimer acids can be obtained by the polymerization of drying or semi-drying oils, free fatty acids or simple aliphatic alcohol esters of these acids, for example, such starting materials rich in the content of linoleic acid and linolenic acid. Suitable drying or semi-drying oils include soybean oil, linseed oil and cottonseed oil and suitable fatty acids include tall oil, soap stock etc. In the polymerization for producing dimer acids, most of the aliphatic acids having sufficient double bond functionalities combine to form mixtures of dibasic acid and higher polymerized fatty acids, probably by Diels-Alder mechanism. Examples of polymerization methods for producing dimer acids have been described in U.S. Pat. Nos. 2,793,219 and 2,793,222. Commercially available dimer acids consist of a major amount of dimer acid ($C_{36}$ long chain aliphatic dibasic acids) and a minor amount of trimer acids (similar $C_{54}$ tribasic acid) and some higher polymerized aliphatic acids and some residual monomers. The polyethylene glycols which are employed as the coupling group of dimer acid molecules are obtained by polymerizing ethylene oxide. The glycols include ethyleneglycol, diethyleneglycol, triethyleneglycol and higher polyethyleneglycols.

The above antisagging agents according to the present invention may be added in predetermined amounts directly to coating materials and readily mixed with them in order to achieve the purpose intended. The amount of the antisagging agent to be used is usually in the range of 0.05 to 10% (percent is by weight here and hereinafter), preferably 0.1 to 3%, based on the total weight of the paint composition. When the amount of the antisagging agent is below the above range, the antisagging effect attained thereby will not be sufficient. If the amount of the antisagging agent is above that range, the coating material in storage will exhibit an undesirably high degree of pigment separation.

The present invention will be illustrated by referring to the following examples.

EXAMPLE 1

(1) Synthesis of antisagging agents:

To 114.4 g. (0.2 mole) of dimer acid prepared by the thermal dimerization of linoleic and linolenic acids obtained from soybean oil to form $C_{36}$ dibasic acids was added diethylene glycol in different amounts of 20.1 g. (0.19 mole), 19.1 g. (0.18 mole), 17.0 g. (0.16 mole), 14.8 g. (0.14 mole), 12.7 g. (0.12 mole), 10.6 g. (0.10 mole), 8.5 g. (0.08 mole), and 4.25 g. (0.04 mole). In the presence of an acid catalyst each mixture was reacted at 210° C. for 3 hours until the hydroxyl value of the reaction mixture reached into a constant value of not more than 10. Eight kinds of test samples of the antisagging agent according to the present invention were thus synthesized.

(2) Preparation of paint:

A composition consisting of

| | Parts by weight |
|---|---|
| Phthalic alkyd resin (on dry basis) | 30 |
| Titanium white | 6.6 |
| Zinc oxide | 13.4 |
| Calcium carbonate | 20.0 |
| Solvent | 30.0 |
| Dryer | 2 | was kneaded in a ball mill for 4 hours and a white paint was prepared.

(3) Tests of antisagging agents:

As the criteria for the evaluation of the antisagging properties of the test paints, the following rating system was adopted.

0 = No sag is observed at all.
1 = Degree of sag is so small the paint does not reach the top end of the lower stage.
2 = Sag or curtaining reaches the lower stage to a limited extent.
3 = Sag streaks to a medium extent or curtaining is serious.
4 = Sag occurs to a serious extent.

As can be seen from Table 1, the antisagging agents according to the invention are highly effective and cause no appreciable decrease of the gloss of the coated film.

TABLE 1

| Test samples of anti-sagging agent | Dimer acid: glycol (molar ratio) | Amount added, percent | Sagging state | | | | | Gloss | |
|---|---|---|---|---|---|---|---|---|---|
| | | | $75\mu$ | $100\mu$ | $150\mu$ | $200\mu$ | $250\mu$ | 1st day | 7th day |
| Blank | | | 2 | 2 | 3 | 4 | 4 | 92.2 | 85.2 |
| Test agent: | | | | | | | | | |
| 1[1] | 1:0.95 | 0.7 | 0 | 0 | 0 | 0 | 0 | 91.4 | 84.0 |
| 2 | 1:0.9 | 0.35 | 0 | 0 | 0 | 0 | 0 | 91.5 | 84.6 |
| | | 0.7 | 0 | 0 | 0 | 0 | 0 | 90.5 | 82.5 |
| 3 | 1:0.8 | 0.35 | 0 | 0 | 0 | 0 | 0 | 90.8 | 83.3 |
| | | 0.7 | 0 | 0 | 0 | 0 | 0 | 90.0 | 80.7 |
| 4 | 1:0.7 | 0.35 | 0 | 0 | 0 | 0 | 0 | 90.5 | 81.6 |
| | | 0.7 | 0 | 0 | 0 | 0 | 0 | 89.5 | 78.1 |
| 5 | 1:0.6 | 0.35 | 0 | 0 | 0 | 0 | 0 | 90.2 | 80.9 |
| | | 0.7 | 0 | 0 | 0 | 0 | 0 | 89.7 | 77.3 |
| 6 | 1:0.5 | 0.1 | 0 | 0 | 0 | 0 | 1 | 91.3 | 81.0 |
| | | 0.35 | 0 | 0 | 0 | 0 | 0 | 91.2 | 80.7 |
| | | 0.7 | 0 | 0 | 0 | 0 | 0 | 90.8 | 76.7 |
| 7 | 1:0.4 | 0.1 | 0 | 0 | 0 | 0 | 1 | 91.5 | 81.0 |
| | | 0.35 | 0 | 0 | 0 | 0 | 0 | 91.4 | 80.4 |
| | | 0.7 | 0 | 0 | 0 | 0 | 0 | 90.4 | 75.5 |
| 8 | 1:0.2 | 0.1 | 0 | 0 | 0 | 1 | 1 | 91.0 | 75.0 |
| | | 0.7 | 0 | 0 | 0 | 0 | 0 | 91.0 | 74.0 |
| Dimer acid | | 0.1 | 0 | 1 | 1 | 2 | 2 | 91.5 | 70.3 |
| | | 0.7 | 0 | 0 | 1 | 1 | 1 | 90.7 | 65.0 |
| Control agent: | | | | | | | | | |
| 1 | | 0.5 | 1 | 3 | 4 | 4 | 4 | 92.5 | 87.8 |
| 2 | | 0.5 | 2 | 3 | 3 | 4 | 4 | 93.3 | 88.6 |

[1] Test agent of invention.

The white paint prepared in accordance with the above (2) was adjusted with thinner to a viscosity of 300 cps. at room temperature. Then, each of the above eight test samples of the antisagging agents synthesized by the above (1) was added to the paint in different proportions of 0.1%, 0.35% and 0.70% by weight on the basis of the amount of the paint composition. The mixtures were thoroughly agitated, allowed to stand overnight, and then applied on a test paper to form coated films of different thicknesses, i.e., 75, 100, 150, 200, and 250 microns. Each test paper was held vertically and the sagging state of the paint was observed. For the evaluation of gloss, a coated film $150\mu$ in thickness was formed on a glass plate, and the reflection factors at 60° C. of the film on the first and seventh days after the film forming were determined with a glossmeter.

For the purpose of comparison, commercially available antisagging agents, i.e., a polyethylene wax type agent (Control agent 1) and a metallic soap type agent (Control agent 2) were respectively added to the same white paint each in an amount of 0.5% by weight on the basis of the paint weight and also the dimer acid only was added to the paint in an amount of 0.7% by weight. The paint compositions thus obtained were tested in exactly the same manner as above described for their antisagging effects and gloss values.

The results were as shown in Table 1.

EXAMPLE 2

To 114.4 g. (0.2 mole) of dimer acid prepared by the thermal dimerization of linoleic and linolenic acids obtained from soybean oil were added respectively 0.1 mole portions of polyethylene glycols having molecular weights of 200, 400, 600, 1000, and 1500, and test samples of the antisagging agent according to the present invention (Test agents 9–13) were synthesized in the same manner as described in Example 1.

Each of the antisagging agents thus prepared was added to a white paint adjusted in viscosity to 300 cps. at room temperature, thoroughly mixed together, and allowed to stand overnight. Then, the paint was applied and tested for the antisagging property and gloss by the same method as in Example 1.

By way of comparison, commercially available antisagging agents, i.e., a polyethylene wax type agent (Control agent 1) and a metallic soap type agent (Control agent 2) were added each in an amount of 0.5% on the basis of the paint weight. The paint compositions thus obtained were tested in exactly the same manner as above described for their antisagging effects and gloss values.

The results are given in Table 2.

As is obvious from Table 2, the antisagging agents of the present invention exhibit outstanding effects as such with no appreciable loss of the gloss.

TABLE 2

| Test samples of antisagging agent | Mol. wt. of polyethyl- glycol | Dimer acid: glycol (molar ratio) | Amount added, percent | Sagging state | | | | | Gloss | |
|---|---|---|---|---|---|---|---|---|---|---|
| | | | | 75μ | 100μ | 150μ | 200μ | 250μ | 1st day | 7th day |
| Blank | | | | 2 | 2 | 3 | 4 | 4 | 92.2 | 85.2 |
| Test agent: | | | | | | | | | | |
| 9 | 200 | 1:0.5 | 0.7 | 0 | 0 | 0 | 0 | 0 | 92.0 | 79.7 |
| 10 | 400 | 1:0.5 | 0.7 | 0 | 0 | 0 | 0 | 0 | 88.9 | 76.1 |
| 11 | 600 | 1:0.5 | 0.7 | 0 | 0 | 1 | 1 | 1 | 89.5 | 79.5 |
| 12 | 1,000 | 1:0.5 | 0.7 | 0 | 1 | 2 | 3 | 3 | 88.4 | 78.7 |
| 13 | 1,500 | 1:0.5 | 0.7 | 1 | 2 | 3 | 3 | 3 | 84.7 | 74.0 |
| Control agent: | | | | | | | | | | |
| 1 | | | 0.5 | 1 | 3 | 4 | 4 | 4 | 92.5 | 87.8 |
| 2 | | | 0.5 | 2 | 3 | 3 | 4 | 4 | 93.3 | 88.6 |

EXAMPLE 3

To 114.4 g. (0.2 mole) of dimer acid prepared by the thermal dimerization of linoleic and linolenic acids obtained from soybean oil was added 6.2 g. (0.1 mole) of ethylene glycol, and thus an antisagging agent (Test agent 14) was synthesized in the same manner as in Example 1.

The agent thus obtained was added to a white paint adjusted in viscosity to 300 cps. at room temperature, in an amount of 0.35% by weight on the basis of the paint weight. After thorough stirring and standing overnight, the paint was applied and tested for the antisagging effect and gloss by the same procedure as in Example 1.

By way of comparison, commercially available antisagging agents, i.e., a polyethylene wax type agent (Control agent 1) and a metallic soap type agent (Control agent 2) were added each in an amount of 0.5% on the basis of the paint weight. The formulations were tested in exactly the same manner as above described for their antisagging effects and gloss values.

The results are shown in Table 3.

were mixed up in a ball mill for 4 hours to prepare a green paint. It was adjusted in viscosity with thinner to 300 cps. at room temperature. An antisagging agent (Test agent 6) obtained by reacting one mole of a dimer acid with 0.5 mole of diethylene glycol was added to the paint in an amount of 0.35% by weight on the basis of the paint weight. After thorough agitation, the mixture was allowed to stand overnight, and then tested for the antisagging effect and gloss of coated film by the same procedure as described in Example 1.

By way of comparison, commercially available antisagging agents, i.e., a polyethylene wax type agent (Control agent 1) and a metallic soap type agent (Control agent 2) were added each in an amount of 0.5% by weight on the basis of the paint weight, and then the mixtures were tested in exactly the same manner as above described for their antisagging effects and gloss values.

The results are given in Table 4.

TABLE 4

| Test samples of anti-sagging agent | Dimer acid: glycol (molar ratio) | Amount added, percent | Sagging state | | | | | Gloss | |
|---|---|---|---|---|---|---|---|---|---|
| | | | 75μ | 100μ | 150μ | 200μ | 250μ | 1st day | 7th day |
| Blank | | | 1 | 2 | 3 | 3 | 3 | 93.7 | 86.8 |
| Test agent 6 | 1:0.5 | 0.35 | 0 | 0 | 1 | 2 | 2 | 92.7 | 90.8 |
| Control agent: | | | | | | | | | |
| 1 | | 0.5 | 1 | 1 | 2 | 3 | 3 | 86.2 | 85.0 |
| 2 | | 0.5 | 1 | 2 | 3 | 3 | 3 | 77.2 | 73.8 |

As can be seen from Table 4, the antisagging agent of the invention has an excellent effect and causes almost no loss of the gloss.

TABLE 3

| Test samples of anti-sagging agent | Dimer acid: glycol (molar ratio) | Amount added, percent | Sagging state | | | | | Gloss | |
|---|---|---|---|---|---|---|---|---|---|
| | | | 75μ | 100μ | 150μ | 200μ | 250μ | 1st day | 7th day |
| Blank | | | 2 | 2 | 3 | 4 | 4 | 92.2 | 85.2 |
| Test agent 14 | 1:0.5 | 0.35 | 0 | 0 | 0 | 0 | 0 | 92.0 | 86.2 |
| Control agent: | | | | | | | | | |
| 1 | | 0.5 | 1 | 3 | 4 | 4 | 4 | 92.5 | 87.8 |
| 2 | | 0.5 | 2 | 3 | 3 | 4 | 4 | 93.3 | 88.6 |

As is clear from Table 3, the antisagging agent embodying the present invention proves very effective and yet causes no substantial decrease in the gloss of coated film.

EXAMPLE 4

A composition consisting of:

| | Parts by weight |
|---|---|
| Phthalic alkyd resin (on dry basis) | 30 |
| Yellow lead | 8 |
| Prussian blue | 1.3 |
| Calcium carbonate | 30.7 |
| Solvent | 30 |
| Dryer | 2 |

EXAMPLE 5

A composition consisting of:

| | Parts by weight |
|---|---|
| Phthalic alkyd resin (on dry basis) | 30 |
| Titanium white | 16.0 |
| Zinc oxide | 16.0 |
| Carbon black | 2.0 |
| Calcium carbonate | 6.0 |
| Solvent | 30 |
| Dryer | 2 | were mixed up in a ball mill for 4 hours to prepare a gray paint. Its viscosity was adjusted with thinner to 300 cps.

at room temperature. An antisagging agent (Test agent 6) obtained by reacting one mole of a dimer acid with 0.5 mole of diethylene glycol was added to the paint in an amount of 0.35% on the basis of the paint weight. After thorough agitation, the mixture was allowed to stand overnight, and then tested for the antisagging effect and gloss of coated film by the same procedure as described in Example 1.

By way of comparison, commercially available antisagging agents, i.e., a polyethylene wax type agent (Control agent 1) and a metallic soap type agent (Control agent 2) were added each in an amount of 0.5% on the basis of the paint weight, and then the mixtures were tested in exactly the same manner as above described for their antisagging effects and gloss values.

The results are given in Table 5.

The results are given in Table 6.

TABLE 6

| Test samples of antisagging agent | Dimer acid: glycol (molar ratio) | Amount added, percent | Sagging state | | | | | Gloss | |
|---|---|---|---|---|---|---|---|---|---|
| | | | 75µ | 100µ | 150µ | 200µ | 250µ | 1st day | 7th day |
| Blank | | | 1 | 1 | 3 | 4 | 4 | 64.9 | 62.4 |
| Test agent 6 | 1:0.5 | 0.35 | 0 | 0 | 0 | 0 | 0 | 44.1 | 42.7 |
| Control agent: | | | | | | | | | |
| 1 | | 0.5 | 0 | 1 | 3 | 4 | 4 | 41.6 | 38.7 |
| 2 | | 0.5 | 0 | 1 | 1 | 3 | 3 | 37.0 | 35.2 |
| 3 | | 0.5 | 0 | 1 | 1 | 3 | 3 | 25.7 | 23.2 |

As can be seen from Table 6, the antisagging agent according to the present invention displays an excellent antisagging effect and causes a relatively little loss of the gloss as compared with the decreases which result from the addition of other antisagging agents.

What we claim is:

1. A method for preventing sagging of paints which comprises adding to an air-drying, oil-modified, synthetic resin, paint composition from 0.05 to 10% by weight, based on the total weight of the paint composition, of a reaction product having carboxyl groups at both ends of the molecule, which reaction product has been obtained by reacting one mole of a dimer acid with from 0.1 to 0.99 mole of a glycol of the formula $$HO-(CH_2CH_2O)_n-H$$

TABLE 5

| Test samples of antisagging agent | Dimer acid: glycol (molar ratio) | Amount added, percent | Sagging state | | | | | Gloss | |
|---|---|---|---|---|---|---|---|---|---|
| | | | 75µ | 100µ | 150µ | 200µ | 250µ | 1st day | 7th day |
| Blank | | | 0 | 1 | 2 | 3 | 3 | 88.6 | 85.7 |
| Test agent 6 | 1:0.5 | 0.35 | 0 | 0 | 0 | 1 | 1 | 88.1 | 83.8 |
| Control agent: | | | | | | | | | |
| 1 | | 0.5 | 0 | 1 | 3 | 3 | 3 | 83.9 | 78.0 |
| 2 | | 0.5 | 0 | 1 | 3 | 3 | 3 | 73.1 | 66.8 |

As can be seen from Table 5, the antisagging agent according to the present invention has an excellent effect as such and causes practically no decrease in the gloss of coated film.

EXAMPLE 6

A composition consisting of:

| | Parts by weight |
|---|---|
| Urethanized oil | 350 |
| Titanium white | 62.5 |
| Zinc oxide | 25 |
| Calcium carbonate | 37.5 |
| Solvent | 27.2 |
| Dryer | 6 | were mixed well in a ball mill for 4 hours to prepare a urethanized paint. It was adjusted in viscosity with thinner to 300 cps. at room temperature. An antisagging agent (Test agent 6) obtained by reacting one mole of a dimer acid with 0.5 mole of diethylene glycol was added to the paint in an amount of 0.35% on the basis of the paint weight. After thorough agitation, the mixture was allowed to stand overnight, and then tested for the antisagging effect and gloss of coated film by the same procedure as described in Example 1.

By way of comparison, commercially available antisagging agents, i.e., a polyethylene wax type agent (Control agent 1), a metallic soap type agent (Control agent 2) and a polymerized oil type agent (Control agent 3) were added each in an amount of 0.5% on the basis of the paint weight, and then the mixtures were tested for their antisagging effects and gloss values in exactly the same manner as above described.

(wherein $n$ is a number from 1 to 30) until the hydroxyl value of the reaction mixture reaches a constant value of less than 10, as an antisagging agent.

2. A method as claimed in claim 1 wherein one mole of the dimer acid is reacted with 0.2 to 0.95 mole of said glycol.

3. A method as claimed in claim 1 wherein said antisagging agent is added in an amount of 0.1 to 0.3% by weight based on the total weight of the paint composition.

4. An air-drying, oil-modified, synthetic resin paint composition containing admixed therein from 0.05 to 10% by weight, based on the total weight of the paint composition, of an antisagging agent consisting of a reaction product having carboxyl groups at both ends of the molecule and obtained by reacting one mole of a dimer acid with from 0.1 to 0.99 mole of a glycol of the formula $HO-(CH_2CH_2O)_n-H$, wherein $n$ is a number from 1 to 30, until the hydroxyl value of the reaction mixture reaches a constant value of less than 10.

References Cited

UNITED STATES PATENTS

| 2,551,387 | 5/1951 | Moffett et al. | 260—407 |
| 3,287,273 | 11/1966 | Furey et al. | 260—407 |
| 3,475,360 | 10/1969 | Ellis et al. | 260—40 |

LEWIS T. JACOBS, Primary Examiner

U.S. Cl. X.R.

260—407